United States Patent [19]

Hisanaga et al.

[11] Patent Number: 4,832,893
[45] Date of Patent: May 23, 1989

[54] METHOD FOR PRODUCING A PLZT COMPOUND

[75] Inventors: Michio Hisanaga, Anjo; Kazunori Suzuki, Nagoya; Masataka Naito, Kariya; Shinichi Shirasaki, Tsukuba, all of Japan

[73] Assignees: Nippondenso Co., Ltd., Kariya; Science and Technology Agency National Institute, Tsukuba, both of Japan

[21] Appl. No.: 135,971

[22] Filed: Dec. 16, 1987

[30] Foreign Application Priority Data

Dec. 17, 1986 [JP] Japan .................... 61-298901
Dec. 17, 1986 [JP] Japan .................... 61-298906

[51] Int. Cl.$^4$ ............................................ B23C 67/00
[52] U.S. Cl. ........................................ 264/125; 75/228; 75/232; 75/234; 75/235; 264/66; 264/332; 419/17; 419/28; 419/55
[58] Field of Search ............... 419/19, 55, 28; 75/228, 75/234, 232, 235; 264/66, 125, 332

[56] References Cited

U.S. PATENT DOCUMENTS

| | | | |
|---|---|---|---|
| 3,862,829 | 1/1975 | Brandmayr et al. | 65/32 |
| 3,923,675 | 12/1975 | Mazdiyashi et al. | 35/46 |
| 3,963,630 | 6/1976 | Yonezawa et al. | 252/62.9 |
| 3,997,690 | 12/1976 | Chen | 427/162 |
| 4,027,209 | 5/1977 | Maher | 361/361 |
| 4,061,583 | 12/1977 | Murata et al. | 252/62.3 |
| 4,135,224 | 1/1979 | Maher | 361/361 |
| 4,152,280 | 5/1979 | Arendt et al. | 252/62.9 |
| 4,152,281 | 5/1979 | Arendt et al. | 252/62.9 |
| 4,230,589 | 10/1980 | Ogawa | 264/65 |
| 4,255,272 | 3/1981 | Ogawa | 264/65 |
| 4,266,265 | 5/1981 | Maher | 264/61 |
| 4,279,866 | 8/1981 | Maher | 361/321 |
| 4,283,228 | 8/1981 | Buchanan et al. | 106/73.3 |
| 4,293,534 | 10/1981 | Arendt | 423/593 |
| 4,306,163 | 11/1981 | Maher | 264/61 |
| 4,324,750 | 4/1982 | Maher | 264/61 |
| 4,391,901 | 7/1983 | Land et al. | 430/495 |
| 4,587,225 | 5/1986 | Tsukuma et al. | 501/105 |
| 4,592,880 | 6/1986 | Murakami | 264/22 |
| 4,624,796 | 11/1986 | Giniewicz et al. | 252/62.9 |
| 4,626,369 | 12/1986 | Walker, Jr. | 252/62.9 |
| 4,643,984 | 2/1987 | Abe et al. | 501/134 |
| 4,696,810 | 9/1987 | Shirasaki et al. | 423/593 |

FOREIGN PATENT DOCUMENTS

| | | |
|---|---|---|
| 51664 | 3/1985 | Japan . |
| 61-53114 | 3/1986 | Japan . |
| 111918 | 5/1986 | Japan . |
| 62-191465 | 8/1987 | Japan . |
| 829603 | 5/1981 | U.S.S.R. . |

OTHER PUBLICATIONS

Brown, L. M., et al., "Cold-Pressing and Low-Temperature Sintering of Alkoxy-Derived PLZT"; Journal of The American Ceramic Society, vol. 55, No. 11, Nov. 1972, pp. 541-544.

*Primary Examiner*—Stephen J. Lechert, Jr.
*Attorney, Agent, or Firm*—Cushman, Darby & Cushman

[57] ABSTRACT

A method for producing PLZT generally expressed as $(Pb_{1-x}La_x)(Zr_{1-y}Ti_y)_{1-x/4}O_3$ ($0 < x \leq 0.3$, $0 \leq y \leq 1.0$) comprises the steps of forming a coprecipitated body by reacting solution containing at least one of Pb, La and Ti with a zirconium-containing solution and a precipitation-forming solution, or (a) forming a solution containing at least one of Pb, La and Ti forming PLZT generally expressed as $(Pb_{1-x}La_x)(Zr_{1-y}Ti_y)_{1-x/4}O_3$ ($0 < x \leq 0.3$, $0 \leq y \leq 1.0$) and a zirconium-containing solution and carrying out a hydrolysis reaction to produce a sol body, (b) drying and then presintering the coprecipitated body at a temperature of from 700° to 1300° C. to form a modified zirconia powder, (c) mixing the presintered body with a compound having a remaining component composition of a required PLZT composition, (d) presintering the mixture at a temperature of from 500° to 1000° C., (e) pressing the obtained presintered powder, and then sintering the molded powder at a temperature of from 1000° to 1300° C.

19 Claims, No Drawings

METHOD FOR PRODUCING A PLZT COMPOUND

BACKGROUND OF THE INVENTION

1. Field of the Invention

The present invention relates to a method for producing a PLZT compound, which is generally expressed as $(Pb_{1-x}La_x)(Zr_{1-y}Ti_y)$ ($0 < x \leq 0.3$, $0 \leq y \leq 1.0$).

PLZT is applied, for example, to a polarizer, a light shutter, an image memory element, etc., as an optoceramic.

2. Description of the Related Art

Among the raw material powders used as a component the PLZT compound, a zirconia raw material is very easily aggregated, and thus, when the PLZT raw material powder using this zirconia raw material is produced by the drying method, the average grain size of the obtained PLZT powder becomes more than about 1 to 2 μm. When the PLZT compound is produced by the PLZT raw material powder having such an average grain size, it is difficult to obtain a PLZT having a high density, high optical transmission, and homogeneous optical properties.

To form a high density sintered body, sintering processes such as a hot pressing and HIP (Hot Isostatic Pressing) etc., are applied, but it is difficult to obtain a high density PLZT from the above PLZT raw material by the above processes.

SUMMARY OF THE INVENTION

Accordingly, an object of the present invention is to overcome the above-mentioned problems.

A further object of the present invention is to provide a method for producing a modified zirconia raw material powder having a good dispersion and submicron size, synthesizing a PLZT powder having an easy sintering property and high bulk density by the drying process using that modified zirconia raw material, and producing a sintered PLZT body having a high density, a high optical transmission, and optically homogeneous properties.

According to the present invention there is provided a method for producing PLZT generally expressed as $(Pb_{1-x}La_x)(Zr_{1-y}Ti_y)_{1-x/4}O_3$ ($0 < x \leq 0.3$, $0 \leq y \leq 1.0$) comprising steps of:

(a) forming a coprecipitated body by reacting a solution containing at least one of Pb, La and Ti with a zirconium-containing solution and a precipitation-forming solution, (b) drying and then presintering said coprecipitated body at a temperature of from 700° to 1300° C. to form a modified zirconia powder, (c) mixing the presintered body with a compound having a remaining component composition of a required PLZT composition, (d) presintering the mixture at a temperature of from 500° to 1000° C., (e) pressing the obtained presintered powder, and then sintering the molded powder at a temperature of from 1000° to 1300° C.

There is further provided a method for producing PLZT generally expressed as $(Pb_{1-x}La_x)(Zr_{1-y}Ti_y)_{1-x/4}O_3$ ($0 < x \leq 0.3$, $0 \leq y \leq 1.0$) comprising the steps of:

(a) forming a solution containing at least one of Pb, La and Ti and a zirconium-containing solution and carrying out a hydrolysis reaction to form a sol body, (b) drying and then presintering said sol body at a temperature of from 700° to 1300° C. to form a modified zirconia powder, (c) mixing the presintered body with a compound having a remaining component composition of a required PLZT composition, (d) presintering the mixture at a temperature of from 500° to 1000° C., (e) pressing the obtained presintered powder, and then sintering the molded powder at a temperature of from 1000° to 1300° C.

DESCRIPTION OF THE PREFERRED EMBODIMENTS

The preferred embodiments will now be described.

As a compound for forming the zirconium solution, oxy-zirconium chloride, oxy-zirconium-nitrate, zirconium chloride and zirconium nitrate are preferably used, and as a solvent for dissolving the above compound, water or alcohol is preferably used. The above compounds are all soluble in water, and the zirconium chloride and tetra-titanium chloride are soluble in ethyl alcohol. Further to make the zirconium solution, metal zirconium may be used by dissolving same with aqua regia and HF.

As compounds to make at least one of the component solutions except for the zirconium solution, i.e., lead solution, lanthanum solution or titanium solution, for example $Pb(NO_3)_2$ for the lead solution; $La(NO_3)_2$, $LaCl_3$ and/or $La_2(SO_4)_3$ for the lanthanum solution or $Ti(NO_3)_4$, $TiCl_4$ and/or $Ti(SO_4)_2$ for the titanium solution, are preferably used. As the solvent of the solution such as $Pb(NO_3)_2$, etc., water or alcohol is preferably used. The zirconium solution and other solutions such as the lead solution, etc., may be separately prepared, and in turn, the compound solution may be prepared by dissolving each compound in the same solvent.

As a reagent to make precipitation forming solution, for example, ammonia, ammonium carbonate, caustic alkali oxalic acid, or ammonium oxalate, or an organic reagent such as amine or oxine, is preferably used. The precipitation-forming reaction is carried out at a room temperature. The coprecipitated body becomes a sol or slurry, and the coprecipitated body is recovered by filtration and crushing.

On the other hand, a hydrolysis reaction is carried out at a heating condition of, for example, a temperature of about 100° C.

Preferably, the kinds and the amount of the component compositions of the PLZT dissolved in a zirconium-containing solution can effectively prevent the aggregation of zirconia powder finally obtained by the addition thereof. The presintering temperature of the sol or slurry body or coprecipitated body is about 700° to 1300° C. When the presintering temperature is lower than 700° C. the body remarkably aggregates, and if higher than 300° C., grain growth is occurred. To the thus obtained body is added the remaining amount of the component composition of lead lanthanum and/or titanium, and mixed therewith.

Of course, it is necessary to supply the remaining amount of the component composition added to the zirconia.

In the addition to supply the remaining amount of each compound powder, mainly the oxide powder, has a submicron-grain size and, even if a lead oxide powder having a size larger than submicron is used, the properties of the obtained PLZT powder are not effected.

The presintering temperature of these mixtures varies widely over a range of from 500° to 1000° C., in each case including Ti, La or Ti and La. The presintering temperature must range from the minimum temperature at which the solid phase reaction is substantially or completely finished to the maximum temperature at which a remarkable grain growth does not occur.

The thus obtained powder is then molded for sintering.

Although the sintering temperatures are varied by the kinds of the component composition of the mixture as well as the above-mentioned presintering temperature, they usually range from 1000° to 1300° C. When the sintering temperature is lower than 1000° C., the sintering does not obtain a satisfactory high density, and if higher than 1300° C., grain growth occurs or a volatilization of Pb is promoted.

Examples of the present inventions will now be described below.

First, examples using the coprecipitation reaction are described.

EXAMPLE 1

40.0 cc of the tetra-titanium chloride solution having a concentration of (0.8 mol/l) and 160.0 cc of oxy-zirconium nitrate having a concentration of (0.8 mol/l) were mixed, and the mixed solution was then gradually added to 1 l of 6N ammonia solution while stirring, so that a coprecipitated body of a hydroxide of $Ti^{4+}$ and $Zr^{4+}$ was obtained. The obtained coprecipitated body was washed and dried, and then presintered at a temperature of 1100° C. to produce $(Zr_{0.8}Ti_{0.2})O_2$ powder. The average grain size of the powder was 0.32 $\mu$m.

Then 18.329 g of the obtained $(Zr_{0.8}Ti_{0.2})O_2$ powder was mixed with 2.942 g of a commercially available $TiO_2$ fine powder, 40.90 g of Pb fine powder having an average grain size of 15 $\mu$m, and 2.592 g of $La_2O_3$ fine powder for 24 hours using a ball mill. The mixture was then presintered at a temperature of 850° C. for 2 hours, and $(Pb_{0.91}La_{0.09})(Zr_{0.65}Ti_{0.35})_{0.978}O_3$ powder was obtained. The average grain size of the obtained powder was 0.32 $\mu$m. A tablet formed by cold pressing the powder under a pressure of 1 ton/cm$^2$ was sintered at a temperature of 1200° C. for 10 hours under an atmosphere of a mixture of lead vapour and oxygen gas. The density of the thus-obtained sintered body, having a thickness of 2.5 mm was 7.84 and the optical transmission was 45% when using a wave length of 600 nm.

EXAMPLE 2

40.0 cc of tetra-titanium chloride solution having a concentration of (0.8 mol/l) 18.405 cc of lanthanum nitrate having a concentration of (0.8 mol/l) and 160.00 cc of oxy-zirconium nitrate having a concentration of (0.8 mol/l) were mixed, and the mixed solution was gradually added to 1.1 of 6N ammonia solution while stirring so that a coprecipitated body of a hydroxide of $La^{3+}$, $Ti^{4+}$ and $Zr^{4+}$ was obtained. The obtained coprecipitated body was washed and dried, and then presintered at a temperature of 1100° C. to produce a $La_{0.09}(Zr_{0.8}Ti_{0.2})_{0.798}O_{2.09}$ powder. The average grain size of the powder was 0.32 $\mu$m.

Then 20.713 g of the obtained powder was mixed with 2.942 g of a commercially available $TiO_2$ fine powder, 40.90 g of Pb fine powder having an average grain size of 15 $\mu$m, and 2.942 g of $La_2O_3$ for 24 hours using a ball mill. The mixture was then presintered at a temperature of 850° C. for 2 hours, and a $(Pb_{0.91}La_{0.09})(Zr_{0.65}Ti_{0.35})_{0.978}O_3$ powder was obtained. The average grain size of the powder was 0.32 $\mu$m. A tablet formed by cold pressing the powder under a pressure of 1 ton/cm$^2$ was sintered at a temperature of 1200° C. for 10 hours under an atmosphere of a mixture of lead vapour and oxygen gas. The density of the thus-obtained sintered body having a thickness of 2.5 mm was 7.81 and the optical transmission thereof was 40% when using a wave length of 600 nm.

EXAMPLE 3

40.0 cc of lanthanum tetra nitrate solution having a concentration of (0.8 mol/l) and 160.0 cc of oxy-zirconium nitrate having a concentration of (0.8 mol/l) were mixed, and the mixed solution was gradually added to 1 l of 6N ammonia solution while stirring, so that a coprecipitated body of a hydroxide of $La^{3+}$ and $Zr^{4+}$ was obtained. The obtained coprecipitated body was washed and dried, and then presintered at a temperature of 1100° C. to produce a $La_{0.09}Zr_{0.782}O_{1.699}$ powder. The average grain size of the powder was 0.32 $\mu$m.

Then 18.156 g of the obtained powder was mixed with 5.502 g of a commercially available $TiO_2$ fine powder, 40.90 g of PbO fine powder having an average grain size of 15 $\mu$m, and 0.554 g of $La_2O_3$ fine powder for 24 hours. The mixture was then presintered at a temperature of 850° C. for 2 hours, and a $(Pb_{0.91}La_{0.09})(Zr_{0.65}Ti_{0.35})_{0.978}O_3$ powder was obtained. The average grain size of the powder was 0.41 $\mu$m. A tablet formed by cold pressing the powder under a pressure of 1 ton/cm$^2$ was sintered at a temperature of 1200° C. for 10 hours under an atmosphere of a mixture of lead vapour and oxygen gas. The density of the thus-obtained sintered body having a thickness of 2.5 mm was 7.80 and optical transmission thereof was 36% when using a wave length of 600 nm.

COMPARATIVE EXAMPLE

Commercially available PbO, $TiO_2$, $ZrO_2$ and $La_2O_3$ powder were prepared so as to have a composition of $(Pb_{0.91}La_{0.09})(Zr_{0.65}Ti_{0.35})_{0.978}O_3$ and mixed for 24 hours, and the obtained powder was presintered at a temperature of 900° C. for 2 hours. Then, the presintered powder was pressed under a pressure of 1 t/cm$^2$ and sintered under the same condition as used in Examples 4 to 6.

The density of the obtained PLZT was about 7.6, but the sintered body was not transparent. The average grain size of the powder in the presintering was 2.8 $\mu$m.

Next, examples using the hydrolysis reaction are described.

EXAMPLE 4

40.0 cc of titanium tetrachloride solution having a concentration of (1.250 mol/l) and 160.0 cc of oxy-zirconium chloride having a concentration of (1.250 mol/l) were mixed. A hydrolysis reaction was carried out by keeping the mixed solution at a temperature of 100° C. for 100 hours so that a sol body including $Ti^{4+}$ and $Zr^{4+}$ was obtained. The obtained body was washed and dried and then presintered at a temperature of 1100° C. to produce $(Zr_{0.8}Ti_{0.2})O_2$ powder. The average grain size of the powder was 0.32 $\mu$m.

Then 9.102 g of the $(Zr_{0.8}Ti_{0.2})O_2$ powder was mixed with 1.465 g of a commercially available $TiO_2$ fine powder, 20.311 g of PbO fine powder having an average grain size of 15 μm, and 1.466 g of La$_2$O$_3$ for 24 hours. The mixture was then presintered at a temperature of 850° C. for 2 hours, whereby (Pb$_{0.91}$La$_{0.09}$)(Zr$_{0.65}$Ti$_{0.35}$)$_{0.978}$O$_3$ powder was obtained. The average grain size of the powder was 0.32 μm. A tablet formed by cold pressing the powder under a pressure of 1 ton/cm$^2$ was sintered at a temperature of 1200° C. for 10 hours under an atmosphere of a mixture of lead vapour and oxygen gas. The density of the thus-obtained sintered body having a thickness of 2.5 mm was 7.84 and the optical transmission thereof was 45% when using a wave length of 600 nm.

EXAMPLE 5

40.00 cc of titanium tetrachloride solution having a concentration of (1.250 mol/l), 10.00 cc of lanthanum nitrate solution having a concentration of (1.250 mol/l) and 160.0 cc of oxy-zirconium chloride having a concentration of (1.250 mol/l) were mixed. A hydrolysis reaction was carried out by keeping the mixed solution at a temperature of 100° C. for 100 hours so that a sol body including La$^{3+}$, Ti$^{4+}$ and Zr$^{4+}$ was obtained. The obtained coprecipitated body was washed and dried and then presintered at a temperature of 1100° C. to produce La$_{0.05}$(Zr$_{0.8}$Ti$_{0.2}$)O$_{2.075}$ powder. The average grain size of the powder was 0.32 μm.

Then 9.750 g of the obtained powder was mixed with 1.465 g of a commercially available TiO$_2$ fine powder, 20.311 g of PbO fine powder having an average grain size of 15 μm, and 8.189 g of La$_2$O$_3$ powder for 24 hours. The mixture was then presintered at a temperature of 850° C. for 2 hours, whereby (Pb$_{0.91}$La$_{0.09}$)(Zr$_{0.65}$Ti$_{0.35}$)$_{0.978}$O$_3$ powder was obtained. The average grain size of the powder was 0.35 μm. A tablet formed by cold pressing the powder under a pressure of 1 ton/cm$^2$ was sintered at a temperature of 1200° C. for 10 hours under an atmosphere of mixture of lead vapour and oxygen gas. The density of the thus-obtained sintered body having a thickness of 2.5 mm was 7.81 and the optical transmission thereof was 40% when using a wave length of 600 nm.

EXAMPLE 6

22.652 cc of lanthanum nitrate solution having a concentration of (1.250 mol/l) and 160.0 cc of oxy-zirconium chloride having a concentration of (1.250 mol/l) were mixed. A hydrolysis reaction was carried out by keeping the mixed solution at a temperature of 100° C. for 100 hours so that a sol body including La$^{3+}$ and Zr$^{4+}$ was obtained. The obtained body was washed and dried and then presintered at a temperature of 1100° C. to produce (La$_{0.09}$Zr$_{0.6357}$O$_{1.406}$)O$_2$ powder. The average grain size of the powder was 0.32 μm.

Then 18.723 g of the obtained powder was mixed with 5.507 g of a commercially available TiO$_2$ fine powder and 40.895 g of PbO fine powder having an average grain size of 15 μm, for 24 hours. The mixture was then presintered at a temperature of 850° C. for 2 hours, whereby (Pb$_{0.91}$La$_{0.09}$)(Zr$_{0.65}$Ti$_{0.35}$)$_{0.978}$O$_3$ powder was obtained. The average grain size of the powder was 0.41 μm. A tablet formed by cold pressing the powder under a pressure of 1 ton/cm$^2$ was sintered at a temperature of 1200° C. for 10 hours under an atmosphere of a mixture of lead vapour and oxygen gas. The density of the thus-obtained sintered body having a thickness of 2.5 mm was 7.80 and the optical transmission thereof was 36% when using a wave length of 600 nm.

COMPARATIVE EXAMPLE

Commercially available PbO, TiO$_2$, ZrO$_2$ and La$_2$O$_3$ powders were prepared so as to form a composition of (Pb$_{0.91}$La$_{0.09}$)(Zr$_{0.65}$Ti$_{0.35}$)$_{0.978}$O$_3$ and mixed for 24 hours, and then the resultant powder was presintered at a temperature of 900° C. for 2 hours. Then, the presintered powder was molded under a pressure of 1 ton/cm$^2$ and sintered under the same conditions as in Examples 4 to 6.

The density of the thus-obtained PLZT was about 7.6, but the sintered body did not become transparent. The average grain size of the powder in the presintering was 2.8 μm.

According to the present invention, by the first presintering process at 700° to 1300° C., a modified zirconia powder containing at least one of the components of the compound of PLZT can be modified to provide a powder having a submicron grain size and little secondary grains, and thus, by using this powder, a submicron grain size PLZT raw material powder can be easily obtained by only a drying method, and a high density PLZT having an improved optical transmission property is realized.

Further since, a fully dispersed modified zirconia powder is obtained by the first presintering, a process for crushing the sintered body is not particularly necessary, and the powder can be directly used as a raw material powder.

The PLZT powder obtained by the drying method using a presintered modified zirconia powder is fully dispersed, and thus, even though a crushing process is not carried out, the PLZT powder is easily sintered and a high density PLZT is obtained.

Further, according to the present invention, a PLZT for optelectronics, which requires an extremely high density and optical homogenization, can be obtained having a high density extremely close to the theoretical density, by only a solid sphere sintering process.

We claim:

1. A method for producing PLZT having the formula (Pb$_{1-x}$La$_x$)(Zr$_{1-y}$)$_{1-x/4}$O$_3$ ($0<x\leq0.3$, $0\leq y\leq1.0$) comprising the steps of:
   (a) forming a coprecipitated body by reacting a solution containing at least one of Pb, La and Ti with a zirconium-containing solution and a precipitation-forming solution,
   (b) drying and then presintering said coprecipitated body at a temperature ranging from 700° to 1300° C. to form a modified zirconia powder, said modified zirconia having a composition of (Zr$_{0.8}$Ti$_{0.2}$)O$_2$,
   (c) mixing the presintered body with a compound having a powder of a remaining component composition of said PLZT composition,
   (d) presintering the mixture at a temperature of from 500° to 1000° C., and
   (e) pressing the obtained presintered powder, and then sintering the pressed powder at a temperature of from 1000° to 1300° C.

2. A method according to claim 1, wherein said lead containing-solution is Pb(NO$_3$)$_2$.

3. A method according to claim 1, wherein said lanthanum-containing solution is selected from the group consisting of La(NO$_3$)$_2$, LaCl$_3$, or La$_2$(SO$_4$)$_3$.

4. A method according to claim 1, wherein said titanium-containing solution is selected from the group consisting of Ti(NO$_3$)$_4$, TiCl$_4$ or Ti(SO$_4$)$_2$.

5. A method according to claim 1, wherein said zirconium-containing solution is selected from the group consisting of oxy-zirconium chloride, oxy-zirconium nitrate, zirconium chloride or zirconium nitrate.

6. A method according to claim 1, wherein said precipitation-forming solution is selected from the group consisting of ammonia, ammonium carbonate, caustic alkali, ammonium oxalate, amine or oxime.

7. A method for producing PLZT having the formula $(Pb_{1-x}La_x)(Zr_{1-y}Ti_y)_{1-x/4}O_3$ ($0 < x \leq 0.3$, $0 \leq y \leq 1.0$) comprising the steps of:
    (a) forming a solution containing at least one of Pb, La and Ti and a zirconium-containing solution and carrying out a hydrolysis reaction to produce a sol body,
    (b) drying and then presintering said sol body at a temperature of from 700° to 1300° C. to form a modified zirconia powder, said modified zirconia powder having a composition of $(Zr_{0.8}Ti_{0.2})O_2$,
    (c) mixing the presintered body with a compound having a powder of a remaining component composition of said PLZT composition,
    (d) presintering the mixture at a temperature of from 500° to 1000° C., and
    (e) pressing the obtained presintered powder, and then sintering the pressed powder at a temperature of from 1000° to 1300° C.

8. A method according to claim 7, wherein said lead-containing solution is $Pb(NO_3)_2$.

9. A method according to claim 1, wherein said lanthanum-containing solution is selected from the group consisting of $La(NO_3)_2$, $LaCl_3$, or $La_2(SO_4)_3$.

10. A method according to claim 7, wherein said titanium-containing solution is selected from the group consisting of $Ti(NO_3)_4$, $TiCl_4$ or $Ti(SO_4)_2$.

11. A method according to claim 7, wherein said zirconium-containing solution is selected from the group consisting of oxy-zirconium chloride, oxy-zirconium nitrate, zirconium chloride or zirconium nitrate.

12. A method for producing PLZT having the formula $(Pb_{1-x}La_x)(Zr_{1-y}Ti_y)_{1-x/4}O_3$ ($0 < x \leq 0.3$, $0 \leq y \leq 1.0$) comprising the steps of:
    (a) forming a coprecipitated body by reacting a solution containing a Ti component for forming the PLZT composition with a zirconium-containing solution and a precipitation-forming solution, and zirconium-containing solution containing a total amount of zirconium component necessary for forming the PLZT composition,
    (b) drying and then presintering said coprecipitated body at a temperature ranging from 700° to 1300° C. to form a modified zirconia powder,
    (c) mixing the presintered body with a compound having a powder of a remaining component composition of said PLZT composition, said remaining component composition containing a remaining amount of the Ti component,
    (d) presintering the mixture at a temperature of from 500° to 1000° C., and
    (e) pressing the obtained presintered powder, and then sintering the pressed powder at a temperature of from 1000° to 1300° C.

13. A method for producing PLZT having the formula $(Pb_{1-x}La_x)(Zr_{1-y}Ti_y)_{1-x/4}O_3$ ($0 < x \leq 0.3$, $0 \leq y \leq 1.0$) comprising the steps of:
    (a) forming a solution containing a Ti component for forming the PLZT composition and a zirconium containing solution and carrying out a hydrolysis reaction to produce a sol body,
    (b) drying and then presintering said sol body at a temperature of from 700° to 1300° C. to form a modified zirconia powder,
    (c) mixing the presintered body with a compound having a powder of a remaining component composition containing a remaining amount of the Ti component,
    (d) presintering the mixture at a temperature of from 500° to 1000° C., and
    (e) pressing the obtained presintered powder, and then sintering the pressed powder at a temperature of from 1000° to 1300° C.

14. A method for producing PLZT having the formula $(Pb_{1-x}La_x)(Zr_{1-y}Ti_y)_{1-x/4}O_3$ ($0 < x \leq 0.3$, $0 \leq y \leq 1.0$) comprising the steps of:
    (a) forming a coprecipitated body by reacting a solution containing at least one of Pb, La and Ti with a zirconium-containing solution in an amount necessary for forming the PLZT composition, and a precipitation-forming solution,
    (b) drying and then presintering said coprecipitated body at a temperature ranging from 700° to 1300° C. to form a modified zirconia powder,
    (c) mixing the presintered body with a compound having a powder of a remaining component composition of said PLZT composition,
    (d) presintering the mixture at a temperature of from 500° to 1000° C., and
    (e) pressing the obtained presintered powder, and then sintering the pressed powder at a temperature of from 1000° to 1300° C.

15. A method for producing PLZT having the formula $(Pb_{1-x}La_x)(Zr_{1-y}Ti_y)_{1-x/4}O_3$ ($0 < x \leq 0.3$, $0 \leq y \leq 1.0$) comprising the steps of:
    (a) forming a solution containing at least one of Pb, La and Ti in an amount necessary for forming the PLZT composition, and a zirconium-containing solution and carrying out a hydrolysis reaction to produce a sol body,
    (b) drying and then presintering said sol body at a temperature of from 700° to 1300° C. to form a modified zirconia powder,
    (c) mixing the presintered body with a compound having a powder of a remaining component composition of said PLZT composition,
    (d) presintering the mixture at a temperature of from 500° to 1000° C., and
    (e) pressing the obtaining presintered powder, and then sintering the pressed powder at a temperature of from 1000° to 1300°.

16. A method for producing PLZT having the formula $(Pb_{1-x}La_x)(Zr_{1-y}Ti_y)_{1-x/4}O_3$ ($0 < x \leq 0.3$, $0 \leq y \leq 1.0$) as in claim 12, wherein said modified zirconia powder has a composition of $(Zr_{0.8}Ti_{0.2})O_2$.

17. A method for producing PLZT having the formula $(Pb_{1-x}La_x)(Zr_{1-y}Ti_y)_{1-x/4}O_3$ ($0 < x \leq 0.3$, $0 \leq y \leq 1.0$) as in claim 13, wherein said modified zirconia powder has a composition of $(Zr_{0.8}Ti_{0.2})O_2$.

18. A method for producing PLZT having the formula $(Pb_{1-x}La_x)(Zr_{1-y}Ti_y)_{1-x/4}O_3$ ($0 < x \leq 0.3$, $0 \leq y \leq 1.0$) as in claim 14, wherein said modified zirconia powder has a composition of $La_{0.09}(Zr_{0.8}Ti_{0.2})_{0.798}O_{2.09}$.

19. A method for producing PLZT having the formula $(Pb_{1-x}La_x)(Zr_{1-y}Ti_y)_{1-x/4}O_3$ ($0 < x \leq 0.3$, $0 \leq y \leq 1.0$) as in claim 15, wherein said modified zirconia powder has composition of $La_{0.05}(Zr_{0.8}Ti_{0.2})O_{2.075}$.

* * * * *